US012095649B2

(12) United States Patent
Kaya et al.

(10) Patent No.: US 12,095,649 B2
(45) Date of Patent: Sep. 17, 2024

(54) TOPOLOGY OPTIMIZATION SYSTEM

(71) Applicant: TUSAS-TURK HAVACILIK VE UZAY SANAYII ANONIM SIRKETI, Kahramankazan/Ankara (TR)

(72) Inventors: Sedat Kaya, Kahramankazan/Ankara (TR); Bekir Gul, Kahramankazan/Ankara (TR); Ibrahim Hokelek, Kahramankazan/Ankara (TR); Muhammet Selim Demir, Kahramankazan/Ankara (TR)

(73) Assignee: TUSAS- TURK HAVACILIK VE UZAY SANAYII AS, Ankara (TR)

( * ) Notice: Subject to any disclaimer, the term of this patent is extended or adjusted under 35 U.S.C. 154(b) by 0 days.

(21) Appl. No.: 18/384,427

(22) Filed: Oct. 27, 2023

(65) Prior Publication Data

US 2024/0163201 A1    May 16, 2024

(30) Foreign Application Priority Data

Nov. 16, 2022   (TR) .............................. 2022/017349

(51) Int. Cl.
*H04L 45/122*      (2022.01)
*H04L 45/02*       (2022.01)

(52) U.S. Cl.
CPC .......... *H04L 45/122* (2013.01); *H04L 45/02* (2013.01)

(58) Field of Classification Search
CPC ....... H04L 45/02; H04L 45/122; H04L 45/22; H04L 45/24
See application file for complete search history.

(56) References Cited

U.S. PATENT DOCUMENTS

| | | | |
|---|---|---|---|
| 11,411,855 B1* | 8/2022 | Flamini | H04L 41/0816 |
| 2014/0098673 A1* | 4/2014 | Lee | H04L 41/122 |
| | | | 370/255 |
| 2015/0139208 A1* | 5/2015 | Chan | H04W 40/16 |
| | | | 370/338 |
| 2015/0350057 A1 | 12/2015 | Huang et al. | |
| 2016/0134527 A1* | 5/2016 | Kwak | H04L 45/036 |
| | | | 370/352 |
| 2016/0191370 A1* | 6/2016 | Wood | H04L 41/122 |
| | | | 370/238 |
| 2019/0306049 A1* | 10/2019 | Ohba | H04L 45/20 |

FOREIGN PATENT DOCUMENTS

CN          104202188 A    12/2014

* cited by examiner

*Primary Examiner* — William G Trost, IV
*Assistant Examiner* — Adam A Cooney
(74) *Attorney, Agent, or Firm* — Notaro, Michalos & Zaccaria P.C.

(57) ABSTRACT

A topology optimization system includes a plurality of electronic equipment that can communicate with each other. At least one source transmits data by the user. At least one receiver receives data by the user. A plurality of virtual links provide communication between the source and the receiver. At least one computer network is created as a mesh network topology with the electronic equipment and virtual links. At least one processor allows modeling of the computer network. At least one alternative path is provided that is likely to create the virtual link on the model of the computer network by the processor.

10 Claims, 2 Drawing Sheets

TOPOLOGY OPTIMIZATION SYSTEM

CROSS-REFERENCE

This application claims priority to Turkish Patent Application No. 2022/017349, filed Nov. 16, 2022, which is incorporated herein by reference.

FIELD

The present invention relates to optimization of delay in genetic algorithm-based data transmission in mesh topologies.

BACKGROUND

Ethernet-based deterministic network solutions have a wide range of uses in many application areas such as avionics, vehicle communications, industrial automation and robotics. Ethernet-based deterministic networking (DTN) technologies have been developed to cope with the high-speed data communication requirements of modern avionics applications. Deterministic networks operate using a global sense of time and a shared schedule among network components. ARINC 664, a common DTN technology, provides limited latency and jitter when safety-critical applications communicate with each other over avionic networks within an aircraft. The most important elements of a typical centralized deterministic communication network are the switch, end systems and virtual links. Applications running on different end systems communicate with each other using virtual links directed by the switch. Limited latency and jitter requirements for virtual links are met by ARINC 664's offline scheduling. Scheduling is provided by the parameters of the number of virtual links, source and target end systems, minimum and maximum frame sizes and bandwidth allocation gap (BAG) for all virtual links. The main idea of providing deterministic communication is to limit the amount of traffic delivered to the network by each virtual link, by adjusting the allowed frame size and BAG values to achieve the desired latency and jitter targets. BAG defines the minimum transmission time between the first bits of two consecutive frames. A traffic shaping mechanism running on each virtual link allows controlling the amount of traffic added by each node and shaping traffic and peak rates that exceed the average. Testing ARINC 664 switches is a challenging task due to their security-critical nature, availability of numerous configuration options, and high-speed operation using thousands of virtual links. Therefore, creating a distributed deterministic communication network by eliminating centralized switches offers an alternative solution to reduce size, weight, and power (SWaP) and increase the availability and maintainability of deterministic data communication with limited latency and jitter. In distributed architecture, centralized central switches are not used and end systems with embedded switching capabilities communicate with each other directly or through the relay concept.

US20150350057, which is included in the known-state of the art, discloses a switchless network topology system for parallel computation. The switchless network topology system includes a plurality of nodes, of which one node communicates with another node according to a routing table. The creation of the routing table includes the following steps: calculating a shortest path of transmission paths between two nodes of the nodes, where the shortest path has no relay node or at least one relay node between the two nodes; removing the transmission path between a starting node and a first relay node of the shortest path and identifying another shortest path between the starting node and the destination node; repeating the step of removing and identifying to identify other shortest paths between the starting node and the destination node; and creating the routing table based on every shortest path between any starting node and any destination node of the nodes.

CN104202188, which is included in the known-state of the art, discloses a method for carrying out AFDX network path optimization by a genetic algorithm. The method relates to virtual link path optimization carried out on an AFDX network configured with a VL path. The method disclosed by the invention comprises the following steps of: establishing a connection matrix and a virtual link path group of a switch at first; and then carrying out chromosome coding on a virtual link path; finally carrying out genetic operations of crossing, variation and selection on a chromosome group, obtaining the optimal chromosome in case of meeting an end condition, and extracting out a valid virtual link path, wherein the path is used as the optimized virtual link path. According to the method disclosed by the invention, path optimization for the virtual link VL in the configured AFDX network is solved, and real-time path optimization for the virtual link VL in the configured AFDX network is carried out by applying the genetic algorithm. Thus, the message transmission real-time performance of the AFDX network is improved.

SUMMARY

Thanks to a topology optimization system according to the present invention, different configurations can be obtained more quickly, and the optimum configuration that enables data transmission with limited latency and jitter among the configurations is achieved.

Another object of the present invention is to reduce size, weight and power (SWaP) and achieve a more connected network topology with higher availability and redundancy against end system failure.

The topology optimization system realized to achieve the object of the invention, which is defined in the first claim and other claims dependent thereon, comprises a plurality of electronic equipment, which is a device at the edge of a computer network that provides information or services to a user. A source is an electronic equipment located at the end and sends the data. A receiver (destination) is an electronic equipment located at the other end and receives the data from the source. Virtual links provide a traffic flow between source and receiver electronic equipment with a guaranteed bandwidth. Ensuring traffic flow with guaranteed bandwidth is defined by setting the bandwidth allocation gap and maximum packet size parameters for each virtual link. A computer network, which has a connected mesh network structure, comprises electronic equipment and virtual links pre-designed by the user. The computer network is modeled through a processor. In order to create virtual links in the computer network through the model, an alternative path is created between the source and the receiver, and such an alternative path is considered to have the potential to create a virtual link.

The topology optimization system according to the invention comprises a plurality of alternative paths to create virtual links on a computer network model, including all possible paths in which the virtual link between each source and receiver can be created. To create a virtual link, all possible paths between the source and receiver are created and stored by the processor. This step is repeated for each virtual link. The number of electronic equipment on the computer network, the source and receiver electronic equipment, and the virtual links between the source and receiver are pre-designed by the user. For configurations created with virtual links of a mesh network-shaped computer network, worst-case delay analysis is performed with the network calculus method, wherein a delay score is obtained for each configuration. The cyclic dependency problem that occurs when obtaining the delay score is solved with a function obtained by the time stopping method. A configuration is created by randomly selecting any of the alternative paths created for each virtual link. The number of configurations created in this way is predetermined by the user. The configurations produced in this way are divided into at least a first category and at least a second category according to their delay scores. The chromosomes in the first category are transferred to the next generation without any changes since the delay score is at a threshold value determined by the user, while the chromosomes in the second category are updated and transferred to the next generations. Chromosomes remaining unchanged in the first category and updated in the second category are classified again according to their delay scores to create the first category and the second category. The following steps are performed: transferring the chromosomes in the first category to the next generation unchanged in the number of iterations predetermined by the user; updating the chromosomes in the second category and transferring them to the next generation; calculating the delay scores again for the updated chromosomes in the second category; reclassifying the first category and the second category transferred to the next generation according to the delay score. When the iteration is completed, the one with the lowest delay score among the last created configurations in the first category is selected as the optimum configuration, such that the virtual link design for the computer network is designed in this configuration. The first category and the second category constitute the hundred percent whole, that is, all configurations. The ratio of the number of chromosomes in the first category to the number of all chromosomes is the threshold value preselected by the user to identify the first category. The ratio of the number of chromosomes in the second category to the number of all chromosomes is a different secondary threshold value preselected by the user to identify the second category. The sum of the threshold value determined by the user to obtain each category is one hundred percent.

In an embodiment of the invention, the topology optimization system comprises random chromosomes generated by the genetic algorithm as initial candidate solutions in a number predetermined by the user. Chromosomes in the genetic algorithm structure represent routing configurations. Each gene on the chromosome represents an alternative path for each virtual link in the computer network. With the genetic algorithm, chromosomes are periodically updated using mutation and crossing until the stopping criterion is met. In each iteration, the delay score of each chromosome is calculated and the best candidates (elites) are placed in the first category. The first category consists of chromosomes with the best delay score, which are equal to the threshold value determined by the user, and directly transferred to next generations. Diversity in the population is provided by mutation and crossing over. Mutation is the random change of at least one gene in the chromosome. Crossing is when at least two different chromosomes break and transfer genes from each other. The second category and the third category are created with as many chromosomes as the threshold value determined by the user. The chromosomes in the second category, which is randomly selected from the population, undergo mutation. In this way, the chromosomes classified in the second category are mutated such that the second category is updated, and the updated second category is passed on to next generations. The chromosomes in the third category, which are randomly selected from the population, are updated by crossing. In this way, the third category has been updated, and the updated third category is passed on to next generations. The delay score is re-calculated for the chromosomes updated in the second category and the third category. In the next iteration, the first category including the unchanged chromosomes, the updated second category including the mutated chromosomes, and the updated third category including the crossed chromosomes, are transferred to the next generations, and these chromosomes are re-classified into the first category, the second category and the third category according to the delay score. When the stopping criterion predetermined by the user is reached, the chromosome with the smallest delay score in the first category obtained in the last iteration is selected as the best solution. The stopping criterion can be a number of iterations predetermined by the user. The user-determined threshold value represents the user selection as a percentage of the population. It constitutes the hundred percent whole, that is, all configurations of the first category, second category and third category. The ratio of the number of chromosomes in the first category to the number of all chromosomes is the threshold value preselected by the user to identify the first category. The ratio of the number of chromosomes in the second category to the number of all chromosomes is the threshold value preselected by the user to identify the second category. The ratio of the number of chromosomes in the third category to the number of all chromosomes is the threshold value preselected by the user to identify the third category. The sum of the threshold value determined by the user to obtain each category is one hundred percent.

In an embodiment of the invention, the topology optimization system comprises a network calculus method applied to ensure the correct behavior of the computer network. For example, the limited latency and jitter guaranteed for certification purposes are achieved for offline network configuration. Network calculus is a mathematical tool that provides delay analysis (with the min-plus algebra method) for each traffic flow at the output ports of electronic equipment. The network calculus method is applied to all chromosomes obtained by the genetic algorithm, so that the delay score is obtained for each chromosome. Alternative routing configurations are obtained by using a delay optimization-based genetic algorithm for switchless ARINC 664 mesh networks with cyclic dependencies, and a delay score, which is the worst delay limit for each routing configuration, is calculated with the network calculus method. For the network calculus, the maximum horizontal distance between the receiver and service curves, as well as the delay score, which is the worst delay limit, are calculated.

In an embodiment of the invention, the topology optimization system comprises the processor that creates a function for solving the loops in traffic flows on interconnecting paths when the network calculus method is applied to computer networks in the form of mesh network topologies. Ports on electronic equipment provide interfaces for creating a computer network. Thanks to the ports on the source and receiver and the data links connected to the ports, virtual links are created and communication between the source and receiver is ensured. It may be the case that there is no separate electronic equipment between the source and the receiver, such that they are directly connected to each other with a data link. In this case, the virtual link is established only via a data link. There may be at least one different electronic equipment and a plurality of data links between the source and the receiver. In this case, while calculating the delay score for the chromosome, the traffic flow in the output ports of the electronic equipment in between and the traffic flow in the data links are also calculated. When calculating the delay of different chromosomes, a circular dependency problem occurs in the virtual link that shares the same output port and/or field data link. In this case, in order to obtain the delay score by performing a network calculus delay analysis on the virtual link that shares the same output port and/or the same data link, the receiver curves of the sharing virtual links must be known. A function is obtained to solve the circular dependency problem encountered in the step of knowing the modified receiver curves. The function is achieved by output bursts of the flow in data links.

In an embodiment of the invention, the topology optimization system comprises the processor that uses the time stopping method to solve the circular dependency problem that occurs with each routing configuration created by the genetic algorithm process. In the time stopping method, the function is obtained with a matrix structure established to calculate the values of the dependent variables in the network calculus equations, which are interdependent, and the delay limits for each traffic flow.

In an embodiment of the invention, the topology optimization system comprises the electronic equipment with at least three ports, thereby having interfaces to form a mesh network topology. Electronic equipment can communicate directly with each other with limited switching capacities. With its limited number of ports, electronic equipment not only provides switching functions, but also provides traffic flow control, programming and redundancy management.

In an embodiment of the invention, the topology optimization system comprises the computer network that is an ethernet-based deterministic network. The computer network consists only of electronic equipment without a central switch.

In an embodiment of the invention, the topology optimization system comprises usage of switchless ARINC 664 mesh network topologies for computer networking, which is an avionics network. ARINC 664 protocol is an Ethernet-based solution for avionic applications that are critical for safety, and meets the deterministic communication requirements of avionic subsystems in ai vehicles with limited delay and deviation. It is created as a switchless end-to-end architecture using ARINC 664 mesh network topology.

In an embodiment of the invention, the topology optimization system comprises the processor that processes the genetic algorithm, wherein the genetic algorithm enables chromosomes to be transferred to next generations with some of them being updated and some remaining unchanged, enables the chromosomes to be transferred to the next generation according to their delay score, and enables some of the categorized chromosomes to remain the same and some of them to be updated a number of times predetermined by the user. Each gene is a random selection of any of the alternative paths generated for the virtual link. A chromosome is created by assigning a gene for each virtual link. Moreover, chromosomes are created differently from each other by combining different genes at a number determined by the user. Each of these routing configurations is a chromosome and is adapted to the genetic algorithm accordingly. The aim here is to obtain different configurations with each iteration, so that the delay score, which is the worst delay limit, is obtained in each configuration. Therefore, the delay score of each configuration obtained with the genetic algorithm is achieved, such that the configuration with the best delay score among all the created configurations is selected as optimum.

In an embodiment of the invention, the topology optimization system comprises first category, second category and third category that are created by the processor based on the percentage value of the population. Categories are created with chromosomes or configurations that fall within the threshold value predetermined by the user. The first category, second category and third category constitute a hundred percent whole, wherein the threshold value is determined as a percent value before the genetic algorithm is run on the processor. The first category, the second category and the third category constitute the hundred percent whole, that is, all configurations. The ratio of the number of chromosomes in the first category to the number of all chromosomes is the threshold value preselected by the user to identify the first category. The ratio of the number of chromosomes in the second category to the number of all chromosomes is the threshold value preselected by the user to identify the second category. The ratio of the number of chromosomes in the third category to the number of all chromosomes is the threshold value preselected by the user to identify the third category. The sum of the threshold value determined by the user to obtain each category is one hundred percent.

BRIEF DESCRIPTION OF THE DRAWINGS

The topology optimization system realized to achieve the object of the present invention is illustrated in the attached drawings, in which.

DETAILED DESCRIPTION

Figure 1:
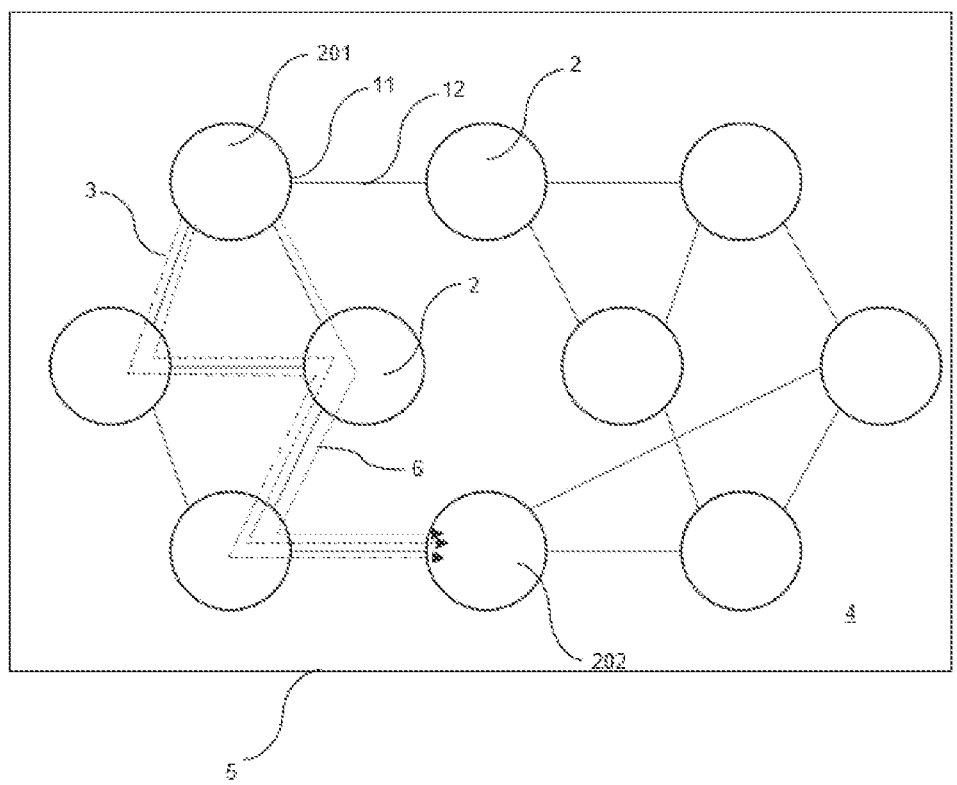
FIG. 1 is a schematic illustration of the computer network.

The topology optimization system (1) comprises a plurality of electronic equipment (2) that can communicate with each other; at least one source (201), which is the electronic equipment (2) designed to transmit data by the user; at least one receiver (202), which is the electronic equipment (2) designed to receive data by the user; a plurality of virtual links (3) that provide communication between the source (201) and the receiver (202); at least one computer network (4) created as a mesh network topology with electronic equipment (2) and virtual links (3); at least one processor (5) that allows modeling of the computer network (4); at least one alternative path (6) that is likely to create the virtual link (3) on the model of the computer network (4) by the processor (5).

Figure 2:
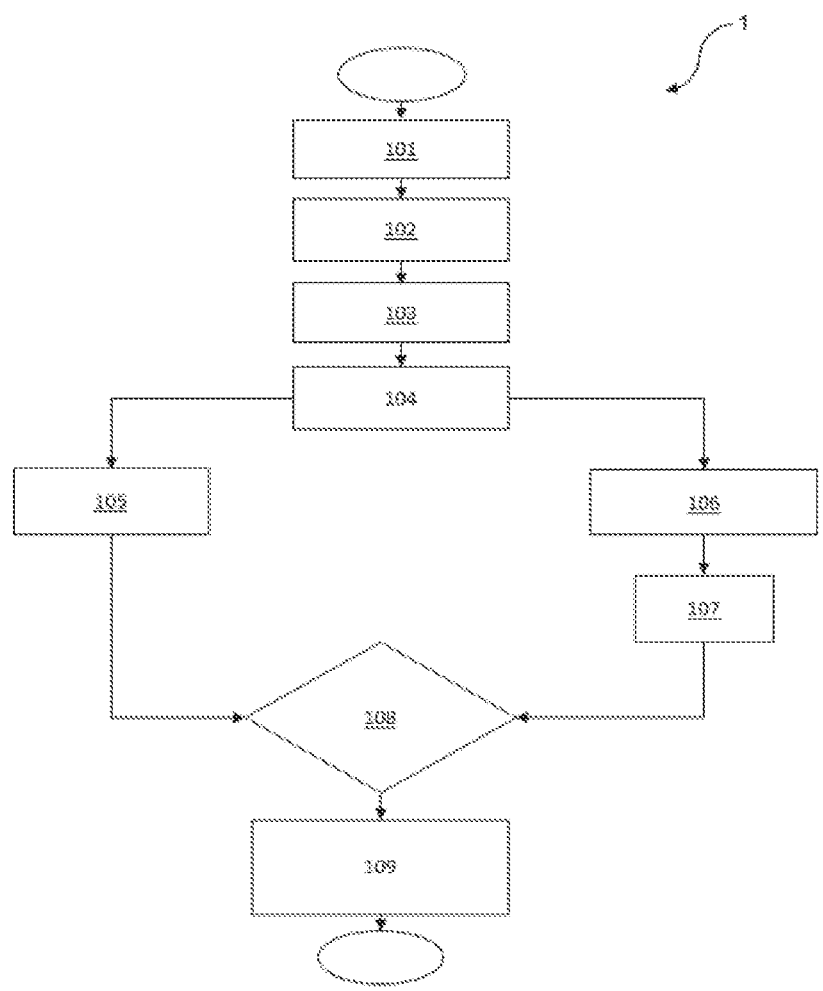
FIG. 2 is a flow chart of the topology optimization system.
All the parts illustrated in figures are individually assigned a reference numeral and the corresponding terms of these numbers are listed below:
1. Topology Optimization System
2. Electronic Equipment
   201. Source
   202. Receiver
3. Virtual Link
4. Computer Network
5. Processor
6. Alternative Path
7. Port
8. Data Link

The topology optimization system (1) according to the invention comprises the processor (5) performing the following steps:
- determining (101) all alternative paths (6) for each virtual link (3);
- selecting (102) any of the alternative paths (6) for each virtual link (3);
- producing (103) configurations at a number predetermined by the user, by combining the selected alternative paths (6);
- obtaining (104) a delay score by calculating data transmission delays for each configuration;
- creating at least a first category (105) and creating at least a second category (106) by categorizing the configurations according to the delay score;
- reconfiguring the configurations in the second category and calculating the delay score for the reconfigured configurations (107);
- storing configurations in the first category and reconfiguring configurations in the second category for the number of iterations predetermined by the user, and recategorizing the configurations stored in the first category and reconfigured in the second category according to the delay score, so that the first category and the second category are re-created (108);
- enabling selection of the configuration (109) with the minimum delay score as the optimum computer network (4) model from the first category created as a result of the iteration (FIG. 1, FIG. 2).

There is a plurality of electronic equipment (2) on the computer network (4). Electronic equipment (2) are connected to each other via data links (8) connected to the ports (7) thereon. A virtual link (3) is created between the electronic equipment (2), which are assigned by the user as the source (201) and receiver (202) determined during the design of the computer network (4). The virtual link (3) provides communication by transmitting data from the source (201) to the receiver (202). It is of vital importance in safety for air vehicle electronics that there is no latency or jitter in the data flow during data transmission by virtual links (3). It is desired to obtain virtual link (3) configurations in order to provide scheduling and routing for secure data flow. Therefore, an alternative path (6) is created between the source (201) and the receiver (202) by creating a model of the computer network (4) on the processor (5).

All alternative paths (6) for the virtual link (3) to be created between each pair of sources (201) and receivers (202) on the computer network (4) model are obtained by the processor (5). For all virtual links (3) to be created on the computer network (4), any of the alternative paths (6) that are likely to create each virtual link (3) is randomly selected, so that configurations are obtained at a number predetermined by the user. For example, to create the first virtual link (3), all alternative paths (6) between the first source (201) and the first receiver (202) are calculated and any one of all the alternative paths (6) is randomly selected for configuration. The delay score, which is the worst delay limit for each of the configurations such-created, is obtained by the network calculus method. In order to solve the common unknowns in the virtual links (3) that intersect during the network calculus, a function is obtained by the time stopping method, such that the circular dependency problem is eliminated by solving the function. The configurations are then classified into the first category and the second category according to their delay scores. While creating the second category, the configurations other than the first category are classified. In other words, alternative routing configurations are created with the genetic algorithm, and the delay scores of the produced configurations are obtained by the network calculus method. Configurations in the first category are assigned as elite and stored without modification to be transferred to the next generation. Configurations in the second category are reconfigured by mutation and crossing, thus creating new updated configurations within the second category. The updated configurations in the second category are transferred to the next generation, and the delay score is calculated for each updated configuration. The configurations in the first category that are transferred to the next generation as such, and the configurations in the second category that are transferred by updating are reclassified according to the delay score, so that the first category and the second category are re-created. Configurations with delay scores at the threshold determined by the user constitute the first category, and the delay scores of the configurations in the first category are lower than the delay scores of the configurations in the second group. Thus, configurations with small delay scores are constantly transferred to the next generation, and the delay score in the resulting configurations is expected to decrease in iterations. The above-mentioned operations are repeated by the processor (5) in the number of iterations predetermined by the user. In each iteration, the first category remains the same and is transferred to the next generation, the second category is updated and transferred to the next generations, the delay scores of the configurations in the updated second category are calculated, and the first category and second category, which are transferred to the next generation, are reclassified according to the delay score, so that the first category and second category are re-created. As a result of the iteration, the configuration with the lowest delay score in the first category created last is selected for the computer network (4). With the topology optimization method according to the invention, in order to provide scheduling and routing for safe data flow, the computer network (4) is created by selecting the configuration with the minimum delay score in order to ensure that the virtual links (3) transmit data according to the worst delay limit (FIG. 1, FIG. 2).

In an embodiment of the invention, the topology optimization system (1) comprises the processor (5) that performs the following steps enabling the execution of the genetic algorithm:
- predetermining the stopping criterion, which is the number of iterations of the genetic algorithm, by the user;
- randomly selecting an alternative path (6) for each virtual link (3) to create the virtual links (3) in the computer network (4) model, and assigning each of the selected alternative path (6) as a gene;
- creating chromosomes at a number predetermined by the user, by random sequencing of genes;
- calculating the delay score of each chromosome;
- providing a first category containing chromosomes with a delay score at a threshold value predetermined by the user;
- providing a second category containing chromosomes with a delay score at a threshold value predetermined by the user;
- providing a third category containing chromosomes with a delay score at a threshold value predetermined by the user;
- transferring the first category to the next generation unchanged until the stopping criterion is met, transferring the chromosomes in the second category and the third category to the next generation by updating, wherein the chromosomes in the second category are mutated and the chromosomes in the third category are crossed over, calculating the delay score for each of the updated chromosomes in the second category and the third category that are transferred to the next generation, re-categorizing the chromosomes in the first category, second category and third category, which are transferred to the next generation, according to the delay score, thereby re-creating the first category, the second category and the third category;

when the stopping criterion is met, selecting the chromosome with the lowest delay score among the chromosomes in the last created first category as the optimum computer network (4) model.

Each chromosome represents each routing configuration. Chromosomes other than the first category and the third category are grouped when creating the second category, and the chromosomes other than the first category and the second category are grouped when creating the third category. When creating the computer network (4) configuration, all combinations of all alternative paths (6) must be taken into account in order to obtain the smallest delay limit. However, this creates a large number of alternative routing configurations. For this reason, the delay score with a more computationally effective network calculus delay limit is obtained for configurations created with the genetic algorithm. It is not necessary to obtain a delay score for each configuration obtained with the entire combination of alternative paths (6). This enables the ideal configuration to be obtained with the desired worst delay limit in a shorter time. Since the configurations generated with the genetic algorithm are transferred to the next generations with the best delay scores, better configurations are generated in each iteration. The stopping criterion can be the number of iterations or the delay score, which is the worst delay limit value. When the iterations are completed by meeting the stopping criterion, the first category obtained includes the chromosomes with the lowest delay score using the network calculus method. Among these chromosomes, the one with the lowest delay score is selected as the optimum computer network (4) configuration. Thus, virtual links (3) are formed in this chromosome.

In an embodiment of the invention, the topology optimization system (1) comprises the processor (5) in which multiple delay scores are obtained by the network calculus method used to calculate the worst-case delay bounds of each chromosome created by the genetic algorithm. Since the delay score is obtained only for chromosomes, i.e. configurations, produced by the genetic algorithm, the configuration with the desired worst delay limit can be obtained without the need to try all combinations. In this way, optimum configuration is achieved with less transaction throughput.

In an embodiment of the invention, the topology optimization system (1) comprises a plurality of ports (7) providing data input and output between the source (201) and receiver (202); a plurality of data links (8) connected to ports (7) to create virtual links (3) that enable communication between the source (201) and the receiver (202); a function that is obtained to solve circular dependency problem occurring in virtual links (3) which is using the common data link (8) and the common port (7) providing data output when calculating the delay score; the processor (5) that enables the function to be solved to obtain the delay score. Obtaining the delay score with the network calculus method for the configurations obtained with all alternative path (6) combinations grows exponentially, causing the circular dependency problem. Obtaining the function to solve the circular dependency problem caused by overlapping virtual links (3) requires quite expensive and long-term operations. To prevent this, time and cost savings are achieved by only obtaining the delay score of configurations produced with the genetic algorithm. Therefore, a less complex function is obtained, which allows circular dependencies to be eliminated and common variables in virtual links (3) to be obtained.

In an embodiment of the invention, the topology optimization system (1) comprises a processor (5) in which the function obtained by the time stopping method is processed. With the time stopping method, the equations obtained using the network calculus method for chromosomes are solved. Thanks to the function obtained by the time stopping method, common variables in the virtual links (3) are obtained.

In an embodiment of the invention, the topology optimization system (1) comprises the electronic equipment (2), each having at least three ports (7), thus providing a connected mesh network topology. As each electronic equipment (2) has at least three ports (7), a computer network (4) is used, which has more interfaces, easier connections with each other, is more redundant and uses a mesh network topology with more alternative paths (6) for data transfer.

In an embodiment of the invention, the topology optimization system (1) comprises the computer network (4), which is a distributed deterministic communication network. Since deterministic networks are time-limited networks, they are used in avionic networks that are critical for security. While creating the avionics network, a lighter, less power consuming and more compact distributed deterministic communication network is established with electronic equipment (2) without a central switch.

In an embodiment of the invention, the topology optimization system (1) comprises the computer network (4), which is a switchless ARINC 664 mesh network. The switchless mesh network topology created by eliminating the central ARINC 664 switch provides limited latency and offsets while reducing size, weight and power.

In an embodiment of the invention, the topology optimization system (1) comprises the processor (5) that enables selection of the chromosome with the minimum cost function with respect to the delay among the first category as the optimum computer network (4) model, after a number of iterations determined by the user. Thus, a sub-configuration set is created without the need to create all combinations by using all alternative paths (6), thus ensuring that the best candidates in this configuration are constantly protected and that the optimum configuration is found without the need to try all configuration possibilities. The configuration obtained as a result of the iteration that minimizes the created cost function with the delay score, is selected as the optimum configuration.

In an embodiment of the invention, the topology optimization system (1) comprises the processor (5) in which the first category, second category and third category are created with the threshold value predetermined by the user as a percentage. All chromosomes in the first category, second category and third category are different from each other, with no intersecting chromosome configuration. By determining the threshold value as a percentage, the chromosome numbers in the first category, second category and third category transferred to the next generation are determined according to the percentage rate of the population. In this way, the determined percentage rates can be applied to different numbers of populations, without the need for an update according to different numbers of populations.

We claim:

1. A topology optimization system comprising:
a plurality of electronic equipment that can communicate with each other;
at least one source (201), which is the electronic equipment designed to transmit data by a user;
at least one receiver (202), which is the electronic equipment designed to receive data by the user;
a plurality of virtual links that provide communication between the source and the receiver (202);
at least one computer network created as a mesh network topology with electronic equipment and virtual links;
at least one processor that allows modeling of the computer network;
at least one alternative path that is likely to create a virtual link on a model of the computer network by the processor, and
wherein the processor is configured to perform the following steps:
determine all alternative paths for each virtual link;
select any of the alternative paths for each virtual link;
produce configurations at a number predetermined by the user, by combining the selected alternative paths;
obtain a delay score by calculating data transmission delays for each configuration;
create at least a first category and create at least a second category by categorizing the configurations according to the delay score;
reconfigure the configurations in the second category and calculate the delay score for the reconfigured configurations (107);
store configurations in the first category and reconfigure configurations in the second category for a number of iterations predetermined by the user, and recategorize the configurations stored in the first category and reconfigured in the second category according to the delay score, so that the first category and the second category are re-created (108);
enable selection of a configuration with a minimum delay score as the optimum computer network model from the first category created as a result of the iteration.

2. A topology optimization system according to claim 1, wherein the processor performs the following steps enabling the execution of the genetic algorithm:
predetermine a stopping criterion, which is the number of iterations of the genetic algorithm, by the user;
randomly select an alternative path for each virtual link to create the virtual links in the computer network model, and assign each of the selected alternative path as a gene;
create chromosomes at a number predetermined by the user, by random sequencing of genes;
calculate the delay score of each chromosome;
provide a first category containing chromosomes with a delay score at a threshold value predetermined by the user;
provide a second category containing chromosomes with a delay score at a threshold value predetermined by the user;
provide a third category containing chromosomes with a delay score at a threshold value predetermined by the user;
transfer the first category to the next generation unchanged until the stopping criterion is met, transfer the chromosomes in the second category and the third category to a next generation by updating, wherein the chromosomes in the second category are mutated and the chromosomes in the third category are crossed over, calculate the delay score for each of the updated chromosomes in the second category and the third category that are transferred to the next generation, re-categorize the chromosomes in the first category, second category and third category, which are transferred to the next generation, according to the delay score, thereby re-creating the first category, the second category and the third category;
when the stopping criterion is met, select the chromosome with the lowest delay score among the chromosomes in the last created first category as the optimum computer network model.

3. A topology optimization system according to claim 1, wherein the processor in which multiple delay scores are obtained by a network calculus method is used to calculate the worst-case delay bounds of each chromosome created by a genetic algorithm.

4. A topology optimization system according to claim 1, comprising:
a plurality of ports providing data input and output between the source and receiver (202);
a plurality of data links connected to ports to create virtual links that enable communication between the source and the receiver (202);
a function that is obtained to solve circular dependency problem occurring in virtual links which is using the common data link and the common port providing data output when calculating the delay score; and
wherein the processor enables the function to be solved to obtain the delay score.

5. A topology optimization system according to claim 1, wherein the processor processes a function obtained by a time stopping method.

6. A topology optimization system according to claim 4, wherein the electronic equipment each has at least three ports, thus providing a connected mesh network topology.

7. A topology optimization system according to claim 1, wherein the computer network is a distributed deterministic communication network.

8. A topology optimization system according to claim 1, wherein the computer network is a switchless ARINC 664 mesh network.

9. A topology optimization system according to claim 1, wherein the processor enables selection of a chromosome with the minimum cost function with respect to the delay among the first category as an optimum computer network model, after a number of iterations determined by the user.

10. A topology optimization system according to claim 1, wherein the processor creates the first category, second category and third category with a threshold value predetermined by the user as a percentage.

* * * * *